(12) United States Patent
Ozaki et al.

(10) Patent No.: US 7,707,079 B2
(45) Date of Patent: Apr. 27, 2010

(54) TAX DECLARATION SYSTEM

(75) Inventors: Mamoru Ozaki, Sagamihara (JP); Mizuhiro Sakai, Saitama (JP); Taiki Sakata, Kawasaki (JP); Mashiho Kawamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1248 days.

(21) Appl. No.: 11/008,278

(22) Filed: Dec. 10, 2004

(65) Prior Publication Data

US 2005/0216379 A1   Sep. 29, 2005

(30) Foreign Application Priority Data

Jan. 29, 2004   (JP)   ............... 2004-022014

(51) Int. Cl.
G07F 19/00   (2006.01)
G07B 17/00   (2006.01)

(52) U.S. Cl. ........................... 705/31; 705/30
(58) Field of Classification Search ........................ None
See application file for complete search history.

(56) References Cited

U.S. PATENT DOCUMENTS

| | | | | | |
|---|---|---|---|---|---|
| 5,193,057 | A | * | 3/1993 | Longfield | 705/31 |
| 5,724,523 | A | * | 3/1998 | Longfield | 705/35 |
| 5,963,921 | A | * | 10/1999 | Longfield | 705/31 |
| 6,202,052 | B1 | * | 3/2001 | Miller | 705/31 |
| 6,226,675 | B1 | * | 5/2001 | Meltzer et al. | 709/223 |
| 7,010,507 | B1 | * | 3/2006 | Anderson et al. | 705/31 |
| 7,127,425 | B1 | * | 10/2006 | Wilson | 705/38 |
| 2002/0013747 | A1 | * | 1/2002 | Valentine et al. | 705/31 |
| 2002/0129257 | A1 | * | 9/2002 | Parmelee et al. | 713/180 |
| 2007/0050277 | A1 | * | 3/2007 | Wilson | 705/35 |

FOREIGN PATENT DOCUMENTS

JP   2002-373226   12/2002

OTHER PUBLICATIONS

Wikipedia.*
Extensible business Reporting Language (XBRL) Specification; Jul. 31, 2000; Walter Hamscher, eSprocket.com, formerly of PricewaterhouseCoopers LLP, David Vun Kannon, KPMG Consulting Inc. pp. 1-27.*
http://www.xbrl.org.

* cited by examiner

*Primary Examiner*—F. Ryan Zeender
*Assistant Examiner*—Mussa Shaawat
(74) *Attorney, Agent, or Firm*—Mattingly & Malur, P.C.

(57) ABSTRACT

An electronic tax declaration system includes an input unit that receives financial information data to be declared; a data conversion unit that converts the received financial information data according to specifications of declaration data; a declaration data generation unit that adds a digital signature to the converted financial information data for generating declaration data and stores it into a storage; a declaration transmission unit that sends the declaration data to a regulator handling a tax; a declaration result reception unit that receives a declaration result of the declaration data from the regulator and stores it into the storage associated with the declaration data; and a loan application unit that creates loan application data by extracting the declaration data and the associated declaration result from the storage and adding a digital signature to them and sends the created loan application data to an external unit.

20 Claims, 12 Drawing Sheets

B/S DATA

| | 30 |
|---|---|
| AVAILABLE ASSET | 123456789 |
| CASH AND DEPOSITS | 12345678 |
| NOTES RECEIVABLE AND ACCOUNTS RECEIVABLE | 2345678 |
| NOTES RECEIVABLE (NET) | 2345678 |
| NOTES RECEIVABLE | 2345678 |
| ALLOWANCE FOR BAD DEBTS | 2345678 |
| ACCOUNTS RECEIVABLE (NET) | 2345678 |
| ACCOUNTS RECEIVABLE | 2345678 |
| ALLOWANCE FOR BAD DEBTS | 2345678 |
| ACCOUNTS RECEIVABLE COMPLETED WORKS (NET) | 2345678 |
| ACCOUNTS RECEIVABLE COMPLETED WORKS | 2345678 |
| ALLOWANCE FOR BAD DEBTS | 2345678 |
| SECURITIES | 2345678 |
| INVENTORIES | 2345678 |
| MERCHANDIZE | 2345678 |
| REAL ESTATE HELD FOR SALE | 2345678 |
| FINISHED GOODS | 2345678 |
| SEMI FINISHED GOODS | 2345678 |
| RAW MATERIALS | 2345678 |
| WORK IN PROCESS | 2345678 |
| SUPPLIES | 2345678 |
| OTHER INVENTORIES | 2345678 |
| ADVANCE PAYMENT | 2345678 |
| PREPAID EXPENSES | 2345678 |
| DEFERRED INCOME TAXES | 2345678 |
| ACCRUED INCOME | 2345678 |

FIG.4

P/L DATA 40

| SALES | 123456789 |
|---|---|
| FINISHED GOODS SALES (NET) | 12345678 |
| FINISHED GOODS SALES (GROSS) | 2345678 |
| GENERAL SALES RETURNS AND ALLOWANCES | 2345678 |
| MERCHANDISE SALES (NET) | 2345678 |
| MERCHANDISE SALES (GROSS) | 2345678 |
| GENERAL SALES RETURNS AND ALLOWANCES | 2345678 |
| GENERAL SALES (NET) | 2345678 |
| GENERAL SALES (GROSS) | 2345678 |
| GENERAL SALES RETURNS AND ALLOWANCES | 2345678 |
| RENTAL REVENUE | 2345678 |
| RENTAL REVENUE (GROSS) | 2345678 |
| GENERAL SALES RETURNS AND ALLOWANCES | 2345678 |
| SERVICES (NET) | 2345678 |
| SERVICES (GROSS) | 2345678 |
| GENERAL SALES RETURNS AND ALLOWANCES | 2345678 |
| INSTALLMENT SALES (NET) | 2345678 |
| INSTALLMENT SALES (GROSS) | 2345678 |
| GENERAL SALES RETURNS AND ALLOWANCES | 2345678 |
| CONSIGNMENT SALES (NET) | 2345678 |
| CONSIGNMENT SALES (GROSS) | 2345678 |
| GENERAL SALES RETURNS AND ALLOWANCES | 2345678 |
| FRANCHISE SALES | 2345678 |
| OTHER SALES (NET) | 2345678 |
| OTHER SALES (GROSS) | 2345678 |
| GENERAL SALES RETURNS AND ALLOWANCES | 2345678 |

FIG.5

MEMBERSHIP DATA DATABASE 160

| USER ID | PASSWORD | MAIL ADDRESS | ACCESS RIGHT | | |
|---|---|---|---|---|---|
| | | | BROWSE | ENTER | UPDATE |
| 12345678 | XXXXXXXX | XXXX@YYYY.co.jp | ○ | × | × |
| 12345679 | XXXXXXXY | XXXY@YY.co.jp | ○ | ○ | ○ |
| 12345680 | XXXXXXXZ | XXXZ@YY.co.jp | ○ | × | × |
| | | | | | |
| | | | | | |

FIG.6

DECLARATION RESULT DATA 60

| DECLARATION NUMBER | ACCEPTANCE NUMBER | TIMESTAMP | SIGNATURE |
|---|---|---|---|
| 98765432 XX | 98765432 YY | 2004/1/1 | DEPARTMENT OF TREASURY |

FIG.7

DECLARATION DATA DB 150

| DECLARATION NUMBER | TAX TYPE | USER ID | B/S DATA | P/L DATA |
|---|---|---|---|---|
| 98765432 XX | INCOME TAX | 12345678 | BS002.xml | PL002.xml |

| PROCESSING FLAG | DECLARATION DATA | DECLARATION RESULT DATA |
|---|---|---|
| ON | TAXDECLA.xbrl | RESULT002.txt |

FIG.8

FINANCING INSTITUTION DATA          80

| FINANCIAL INSTITUTION NAME | ADDRESS | TELEPHONE NUMBER | MAIL ADDRESS |
|---|---|---|---|
| BANK A | 1-1-1 YYY, XXX CITY | 044-XXX-XXXX | YYYY@ZZZZ.co. jp |

FIG.9

XBRL Taxonomy          103

| PROCESSING RULE (BUSINESS KNOW-HOW) |
|---|
| THE DIFFERENCE BETWEEN THE INSTANCE OF LAST YEAR (PREVIOUS PERIOD) AND THE INSTANCE OF THIS YEAR (THIS PERIOD) IN THE ' SECURITIES ' OF THE AVAILABLE ASSET IN THE B/S (BALANCE SHEET) MUST BE EQUIVALENT TO THE TOTAL OF THE " EXPENDITURE OF PURCHASING SECURITIES " AND THE " REVENUE OF SELLING SECURITIES " IN C/F (CASH FLOW). |

TAX DECLARATION SYSTEM

INCORPORATION BY REFERENCE

The present application claims priority from Japanese application JP 2004-022014 filed on Jan. 29, 2004, the content of which is hereby incorporated by reference into this application.

BACKGROUND OF THE INVENTION

The present invention relates to a system for electronically declaring a tax, a method for electrically declaring a tax, and a software program for the system and the method.

Today, to declare a tax, a declarer, a tax accountant, or an accountant fills in a form with data to declare and mails or brings the filled-in form to a government agency or a regulator responsible for the tax. A system for declaring a tax by transmitting electronic data via a network is now under study. An example of such an electronic tax declaration system is disclosed in JP-A-2002-373226.

On the other hand, when applying to a third party, such as a financial institution, for a loan, a tax declaration form accepted by a government agency is sometimes used as a form that proves the income of a person or the financial status of a company that applies for the loan.

XBRL (eXtensible Business Reporting Language) is available for use as a language for electronically describing financial information data. XBRL, an XML (extensible Markup Language) based language for describing information used for finance and management, is suitable for describing financial statements, such as a balance sheet and a profit and loss statement of a company, or financial information data such as internal accounting reports. XBRL is introduced at a web site at http://www.xbrl.org/.

SUMMARY OF THE INVENTION

It is an object of the present invention to provide a system that allows a user to electronically declare a tax and to reuse the declaration data.

It is another object of the present invention to provide a system that proves the authority, that is, the fact that the declaration data was accepted by a government agency, when declaration data is reused.

It is still another object of the present invention to provide a tool for converting various data formats for automatically generating declaration data.

To solve the problems described above, a tax declaration system according to the present invention includes an input unit that receives financial information data to be declared; a data conversion unit that converts the received financial information data according to specifications of declaration data; a declaration data generation unit that adds a digital signature to the financial information data, which has been converted by the data conversion unit, for generating declaration data and stores the declaration data into a storage unit; a declaration transmission unit that sends the declaration data to a regulator handling a tax; a declaration result reception unit that receives a declaration result of the declaration data from the regulator and stores the declaration result associated with the declaration data into the storage unit; and a loan application unit that creates loan application data and sends the created loan application data to an external unit by extracting the declaration data and the associated declaration result from the storage unit and adding a digital signature to the extracted declaration data and the declaration result.

Other objects, features and advantages of the invention will become apparent from the following description of the embodiments of the invention taken in conjunction with the accompanying drawings.

DESCRIPTION OF THE EMBODIMENTS

Embodiments of the present invention will be described in detail below with reference to the drawings. For simplicity, a tax accountant and an accountant are called generically an accountant and it is assumed that the government agency that handles a tax is the Department of the Treasury and that the third party organization such as a financial institution is a bank. It is also assumed that tax declaration data is created in XBRL in this embodiment.

1. Configuration

Figure 1:
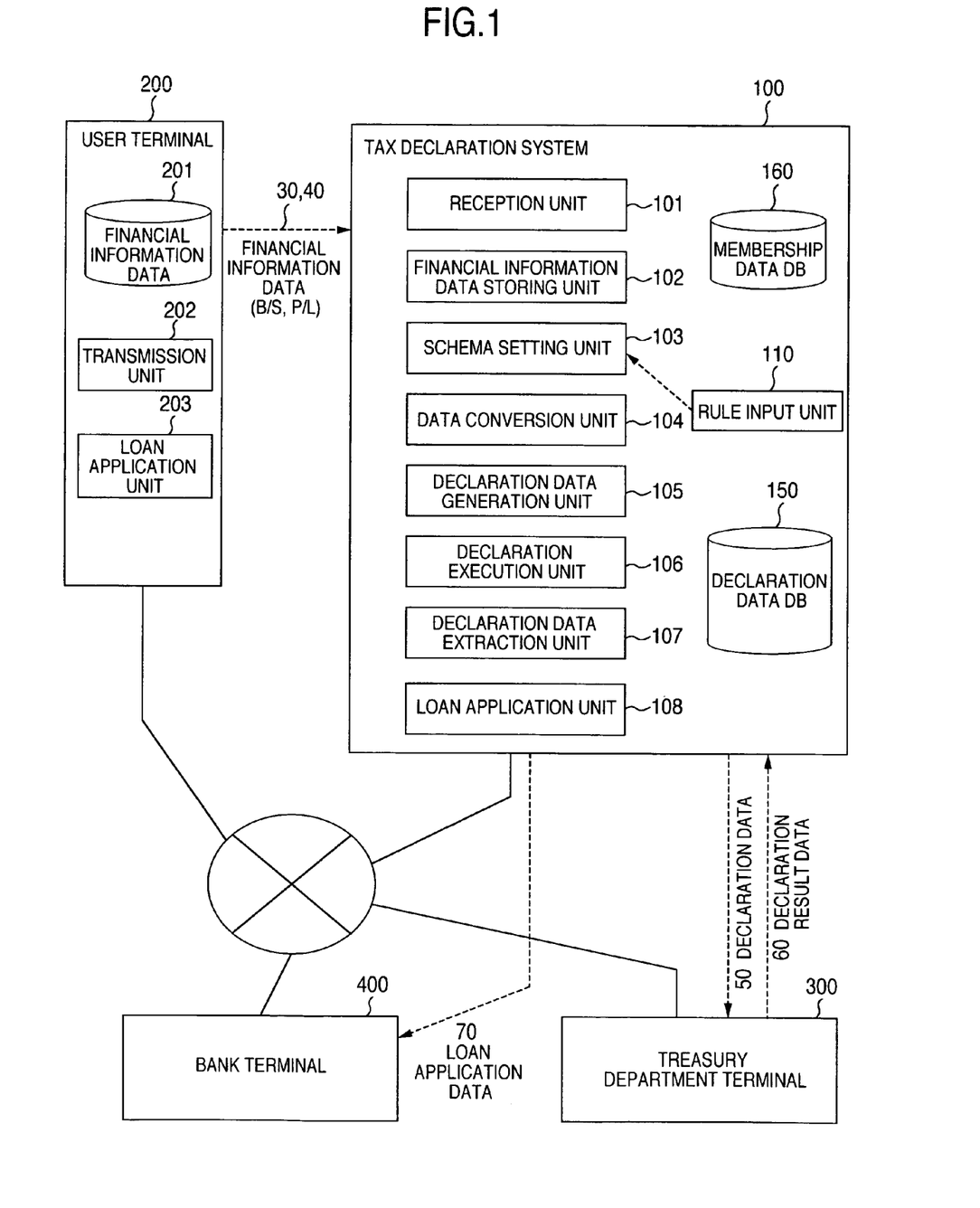
FIG. 1 is a diagram showing an example of the configuration of a network including a tax declaration system according to the present invention.

FIG. 1 is a diagram showing an example of the configuration of a network including a tax declaration system in this embodiment. A tax declaration system 100 is a system used by an accountant who performs tax declaration processing on behalf of a tax declarer (user). A user terminal 200 is a terminal from which the user enters data. The Treasury Department terminal 300 is a terminal used by the Department of the Treasury to accept declaration data and to return a declaration result. A bank terminal 400 is a terminal installed in a accepts a loan application request. The system 100 and the terminals 200, 300, and 400 are computers each with the communication function. The system 100 and the terminals 200, 300, and 400 are connected to a network such as the Internet or a telephone network. Although not shown in FIG. 1, a Certificate Authority is also connected to the network for verifying a digital signature.

The tax declaration system 100 comprises a reception unit 101 that receives financial information data 30 and 40 for declaration processing from the terminal 200, a financial information data storing unit 102 that stores financial information data into a declaration data database 150 (hereinafter called a database), a schema setting unit 103 that defines the specifications of declaration data to be sent to the Treasury Department terminal 300, a data conversion unit 104 that converts financial information data to declaration data specifications defined by the schema setting unit 103, a declaration data generation unit 105 that generates declaration data by adding a digital signature to financial information data converted by the data conversion unit 104 and stores the generated declaration data into the database 150, a declaration execution unit 106 that sends declaration data 50 to the Treasury Department terminal 300, receives declaration result data 60 from the Treasury Department terminal 300, and stores the received data into the database 150, a declaration data extraction unit 107 that extracts declaration data and declaration result data from the database 150, and a loan application unit 108 that adds a digital signature to the extracted data and sends the signed data to the bank terminal 400. The tax declaration system 100 further comprises a membership data database 160 in which user information is stored and the declaration data database 150 described above. In addition, the tax declaration system 100 may further comprise a rule input unit 110 that accepts a schema definition from the manager of the system 100 for defining the specifications and conversion rules for declaration data.

The user terminal 200 comprises a data file 201 in which financial information data to be sent to the tax declaration system 100 described above is stored, a transmission unit 202 that sends financial information data stored in the data file 201 to the tax declaration system 100, and a loan application unit 203 that receives and sends loan application data and applies a loan to a bank.

The components described above may be implemented by either a dedicated processor or by a software program executed by computers constituting the system or the terminal.

2. Tax Declaration

A procedure for executing a tax declaration method in this embodiment will be described.

2.1 Financial Information Entry

Figure 10:
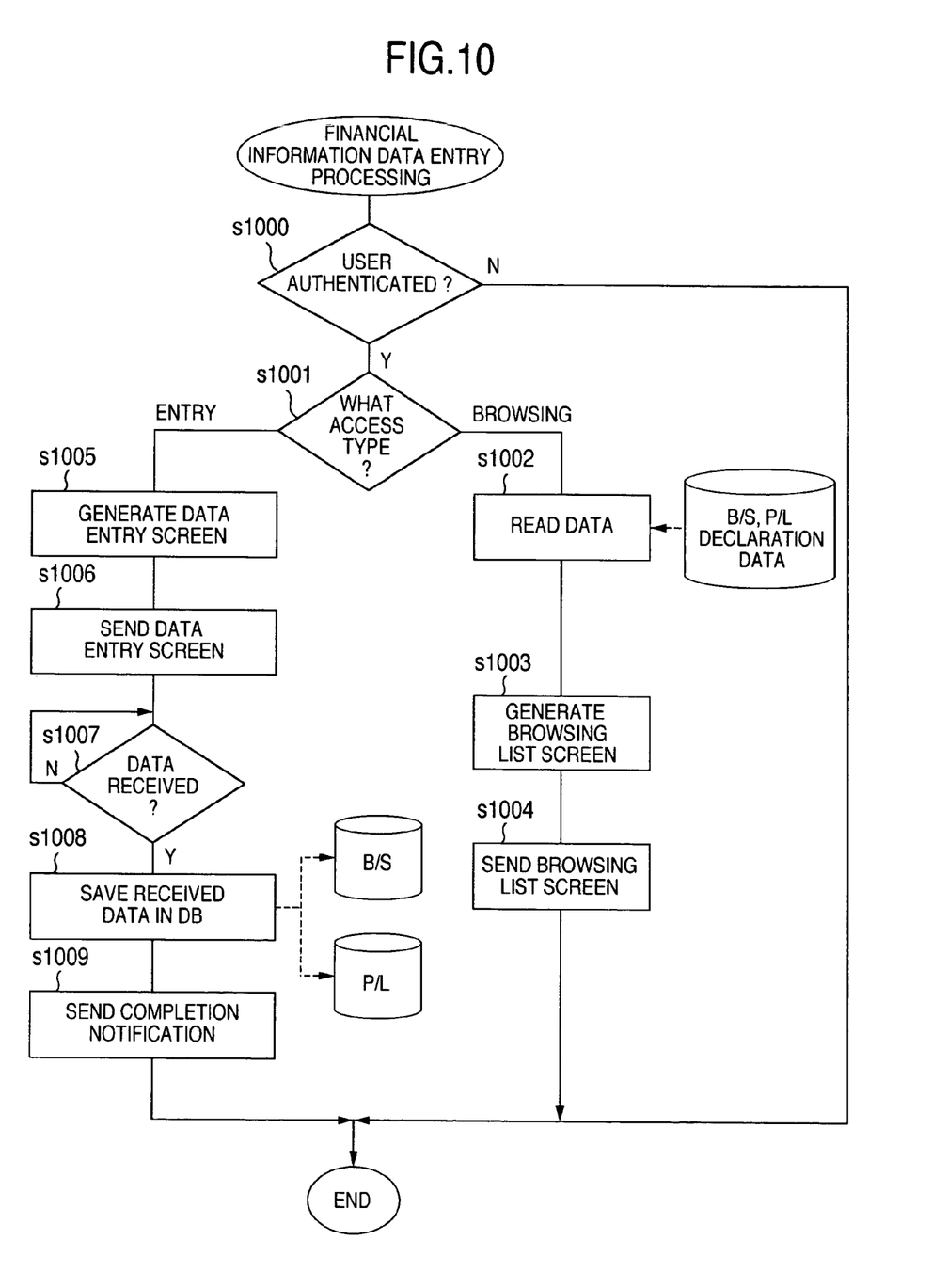
FIG. 10 is a flowchart showing the entry processing of financial information data from a user terminal according to the present invention.

First, a user enters financial information data via the user terminal 200 and sends it to the tax declaration system 100. FIG. 10 is a flowchart showing the entry processing of financial information data executed on the user terminal 200. When the user accesses the tax declaration system 100 via the user terminal 200, the reception unit 101 of the tax declaration system 100 returns a login screen 1500 (FIG. 15) to the user terminal 200.

The reception unit 101 checks if the access from the user terminal 200 is sent from a member of the tax declaration service provided by the tax declaration system 100. To do so, the reception unit 101 acquires authentication information such as a user ID and a password via the user terminal 200 and checks them using the membership data database 160. The user is authenticated in this way (s1000).

Figure 5:
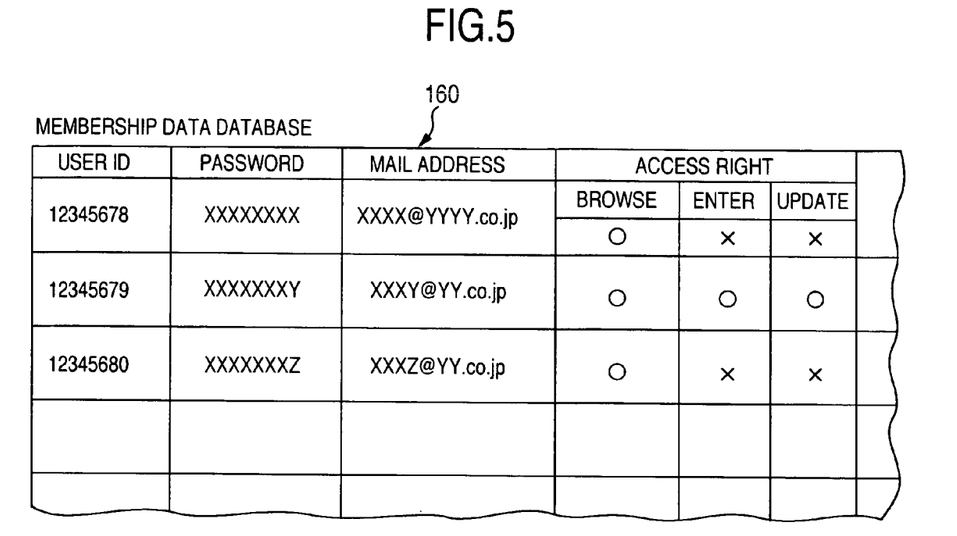
FIG. 5 is a diagram showing an example of a membership data database.

FIG. 5 shows an example of the structure of the membership data database 160. Each record in the membership data database 160 includes information, such as a name, a password, a mail address, and an access right to declaration data in the tax declaration system 100, with a user ID as the key. In addition, the record may include information necessary for tax declaration, such as an address, the date of birth, a social security number, an occupation, and the place of employment as well as biometrics information and an encryption key depending upon the authentication method.

If it is found that the user is not a member as a result of the user authentication (s1000: N), the reception unit 101 terminates the processing; on the other hand, if it is found that the user is a member (s1000: Y), the reception unit 101 determines the type of access purpose (s1001). The reception unit 101 presents a screen 1510 to the user terminal 200 and accepts one of three selections: financial information data transmission (data transmission), financial information data browsing (data browsing), and loan application.

Figure 15:
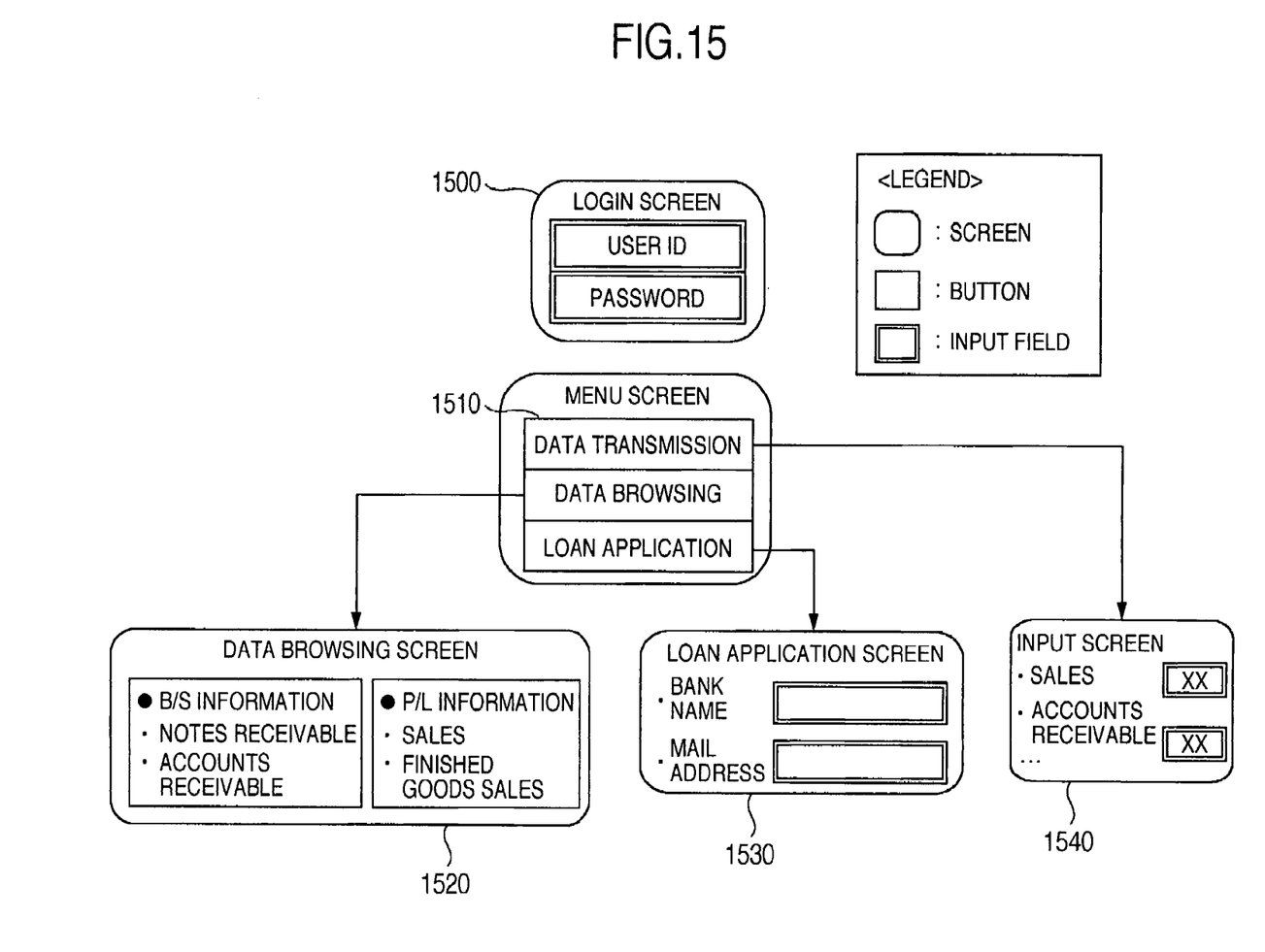
FIG. 15 is a diagram showing the screen transition on a user terminal according to the present invention.

When "data browsing" is selected from the user terminal 200 (s1001: Browsing), the reception unit 101 reads the financial information data on the user from the database 150 (s1002) and generates the browsing data list screen (s1003). A screen 1520 generated in this step is sent to the user terminal 200 (s1004).

When "loan application" is selected in the screen 1510, the reception unit 101 passes control to the declaration data extraction unit 107.

On the other hand, if "data transmission" is selected in the screen 1510 (s1001: Entry), the reception unit 101 generates a financial information data entry screen 1540 (s1005) and sends it from the tax declaration system 100 to the user terminal 200 (s1006). After financial information data is entered at the user terminal 200 and the entered data is returned (s1007: Y), the reception unit 101 receives the data, assigns a declaration number (example: accountant ID+sequence number), which is unique across the nation, to the received data and sends the data to the financial information data storing unit 102 to store the data into the database 150 (s1008).

The reception unit 101 notifies the user terminal 200 that the financial information data is received (s1009) and terminates the processing.

Figure 3:
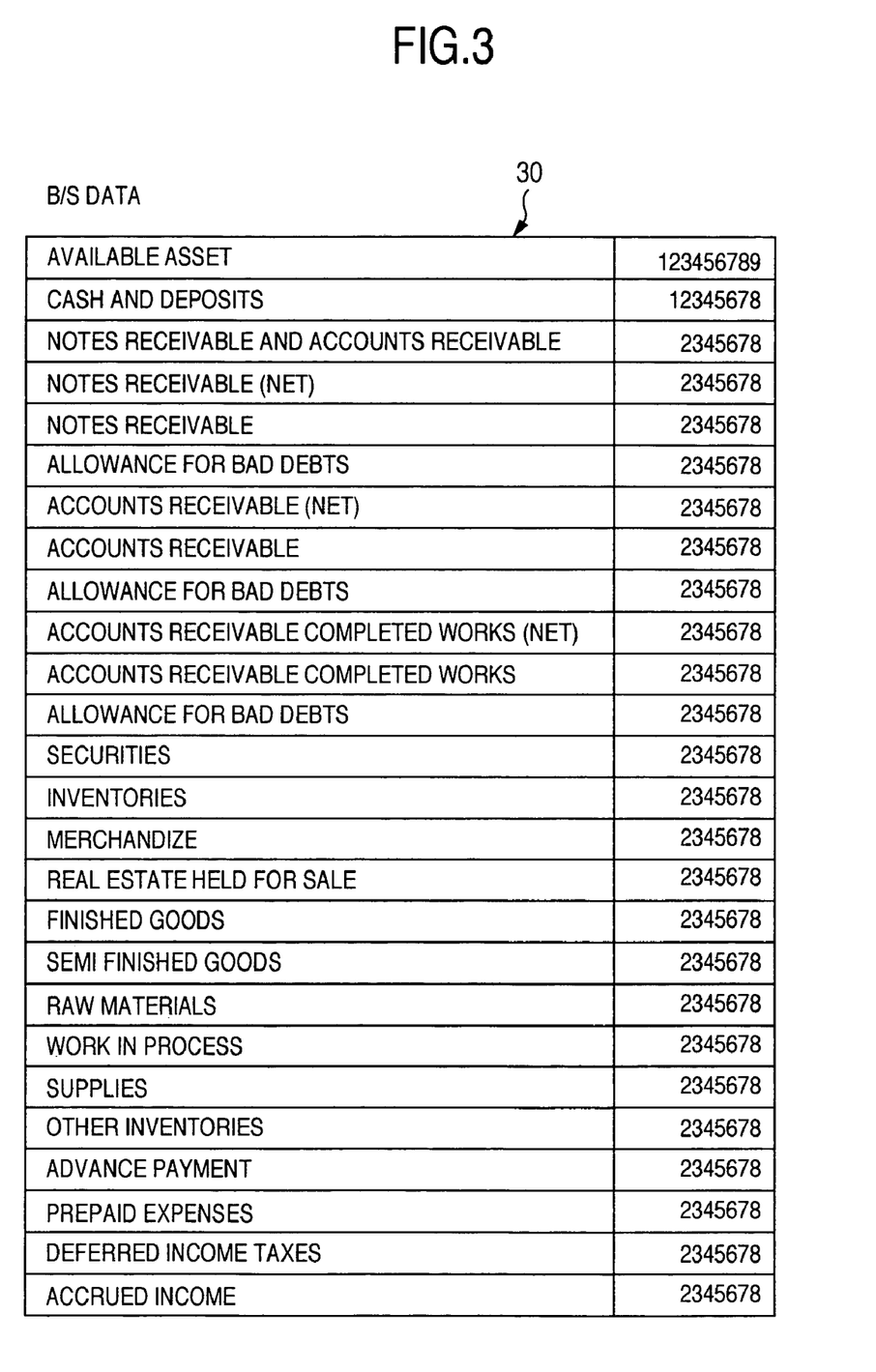
FIG. 3 is a diagram showing an example of B/S (Balance Sheet) data.
Figure 4:
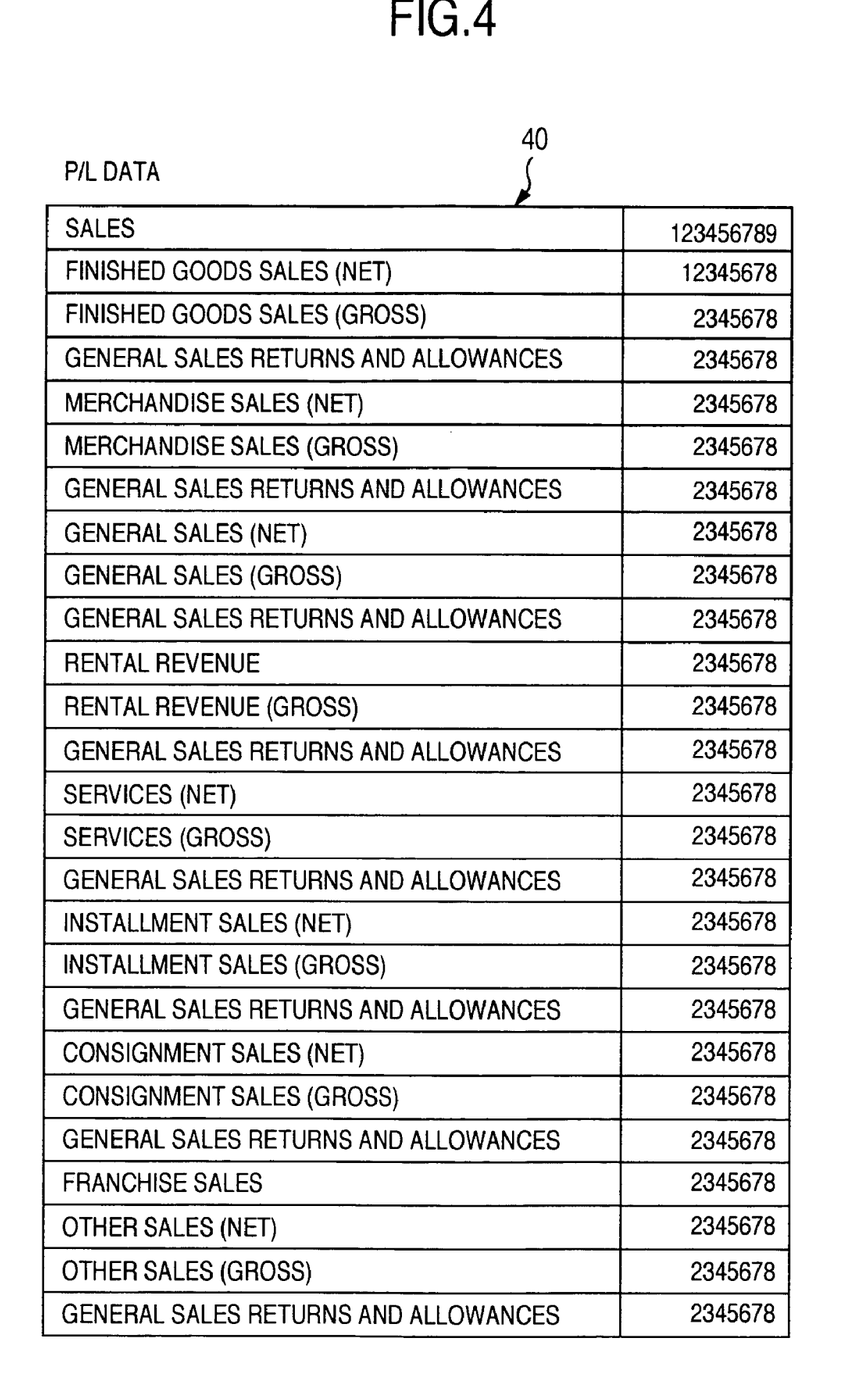
FIG. 4 is a diagram showing an example of P/L (Profit and Loss Statement) data.

An example of financial information data sent from the user terminal 200 is shown. The financial information data is composed of B/S (Balance Sheet) data and P/L (Profit and Loss Statement) data. FIG. 3 shows an example of B/S data, and FIG. 4 shows an example of P/L data.

Figure 7:
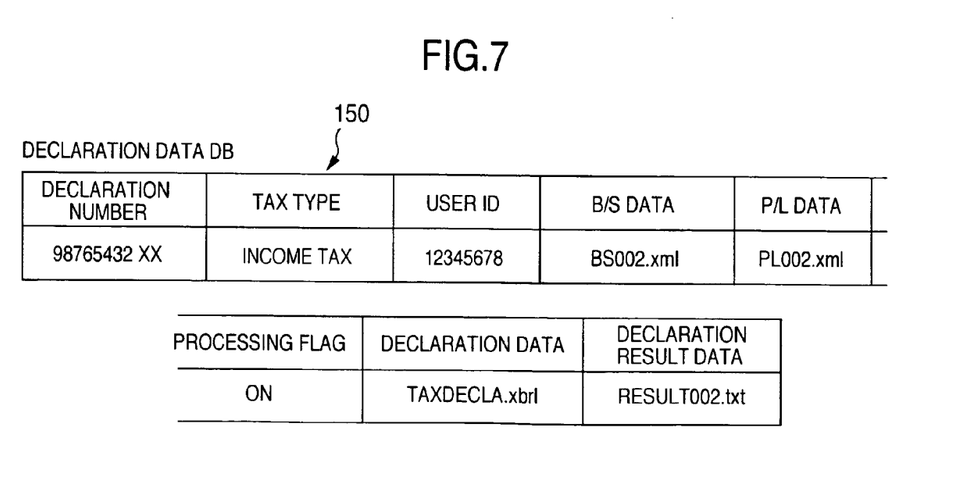
FIG. 7 is a diagram showing an example of the structure of a declaration data database.

FIG. 7 shows an example of the configuration of a record stored in the declaration data database (database) 150. The record has the following entries with the declaration number as the key: tax type, user ID, B/S data, P/L data, processing flag, declaration data, and declaration result data. Each record is created when data sent from the user terminal is accepted. The B/S data field and the P/L data field contain the name of the file in which data sent from the user terminal is stored. The processing flag, the declaration data, and the declaration result data will be described later.

The reception unit 101 checks the format of the financial information data sent from the user terminal 200 and, if the financial information data, that is, B/S data and P/L data, is coded in XML, stores the financial information data into the database 150 without converting it. If the financial information data is not coded in XML, the reception unit 101 converts the financial information data into the XML format and stores the converted data into the database 150.

2.2 Declaration Data Generation and Transmission

Figure 12:
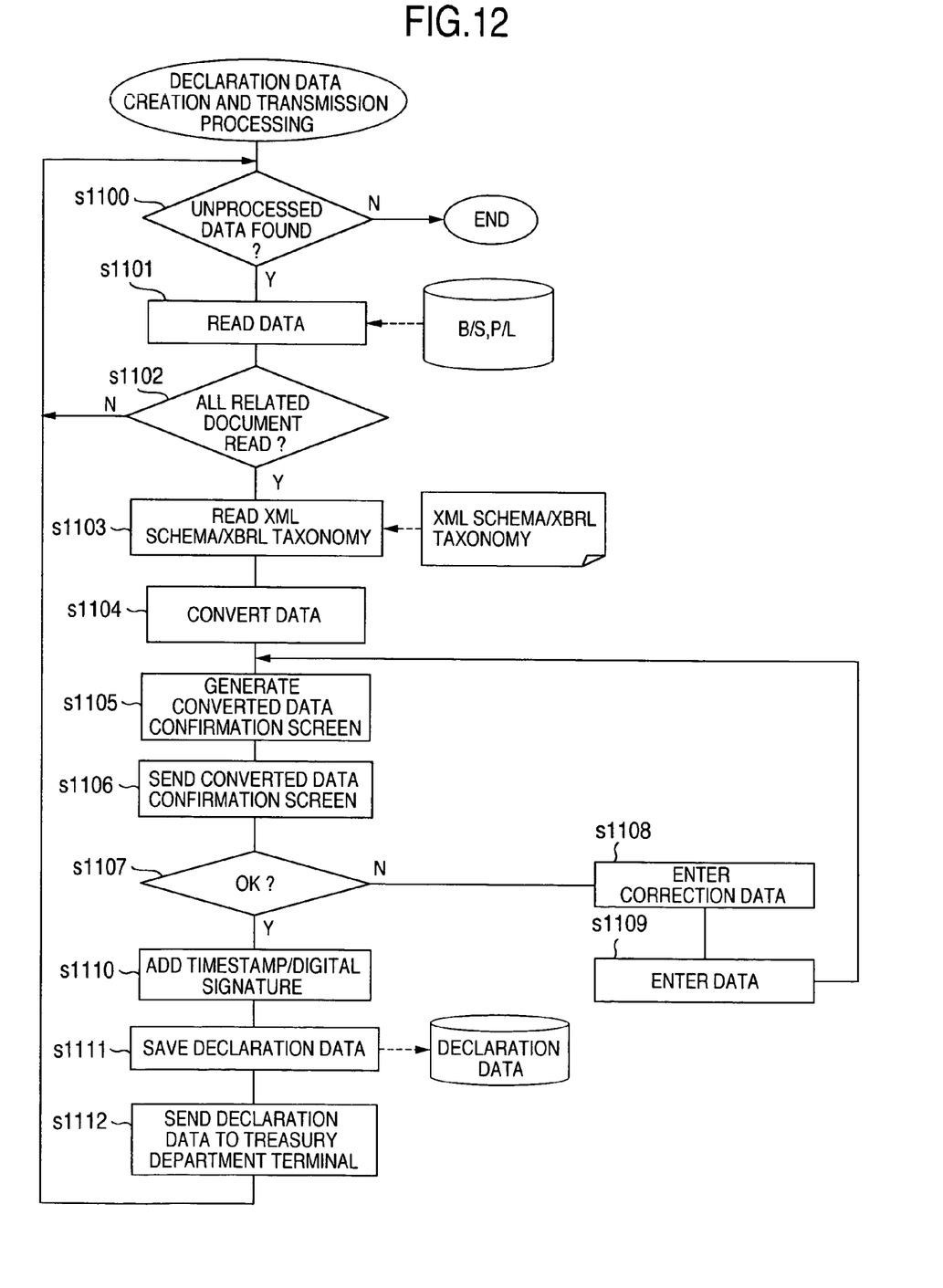
FIG. 12 is a flowchart showing the declaration data creation and transmission processing of a tax declaration method according to present invention.

With reference to FIG. 12, the following describes how the tax declaration system 100 converts financial information data received from the user terminal 200, generates declaration data, and sends the generated declaration data to the bank terminal 400.

The declaration data generation unit 105 of the tax declaration system 100 checks the processing flag of the financial information data in each record in the database 150 (s1100). This processing flag indicates whether the financial information (data identified by B/S data field and P/L data field) in the database 150 is already converted to declaration data and is sent.

If there is an unprocessed record, the declaration data generation unit 105 reads the financial information data from the database 150 (s1102). The read processing continues until all data related to the financial information data is read (s1102).

The declaration data generation unit 105 asks the data conversion unit 104 to convert the financial information data, which is read, using the XBRL taxonomy according to the data attribute or the tax type (s1103, s1104). For this conversion processing, see "3. Data conversion" in the next section.

The declaration data generation unit 105 edits the converted financial information data into screen information so that the user can confirm it on the user terminal 200 (s1105), sends the information to the user terminal 200 (s1106), and makes the user check if there is a correction (s1107). If there is a correction (s1107: N), the declaration data generation unit 105 accepts correction data (s1108), reflects the correction data on the converted financial information data (s1109), and returns to step s1105.

On the other hand, if there is no correction (s1107: Y), the declaration data generation unit 105 adds the declaration number, declarer information, and timestamp to the converted financial information data, adds the digital signature of the tax declaration system 100 or the accountant to the financial information data to create declaration data (s1110) and, at the same time, stores the declaration data into the database 150 (s1111). The file name of declaration data is stored into the declaration data field of the corresponding record in the database 150 in FIG. 7.

The declaration data generation unit 105 asks the declaration execution unit 106 to send the declaration data to the Treasury Department terminal 300 and turns on the processing flag in the database 150 (s1112). After that, control is passed back to step s1100 to check if all records are processed.

Figure 11A:
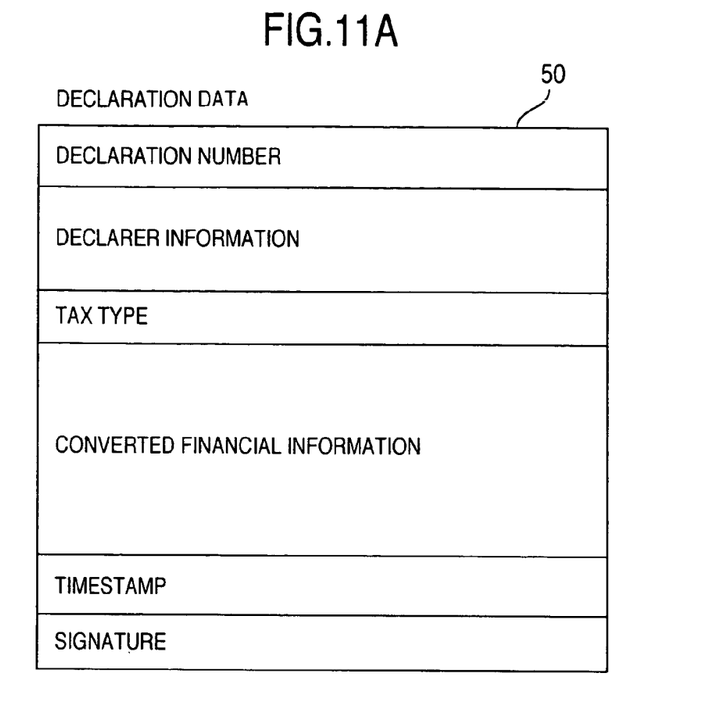
FIG. 11A is a diagram showing an example of the structure of declaration data and FIG. 11B is a diagram showing an example of the structure of loan application data.

FIG. 11A shows an example of the configuration of declaration data 50.

2.3 Declaration Result Reception

After the tax declaration system 100 sends tax declaration data to the Treasury Department terminal 300 as described above, the tax declaration system 100 receives the declaration result from the Treasury Department terminal 300.

Figure 6:
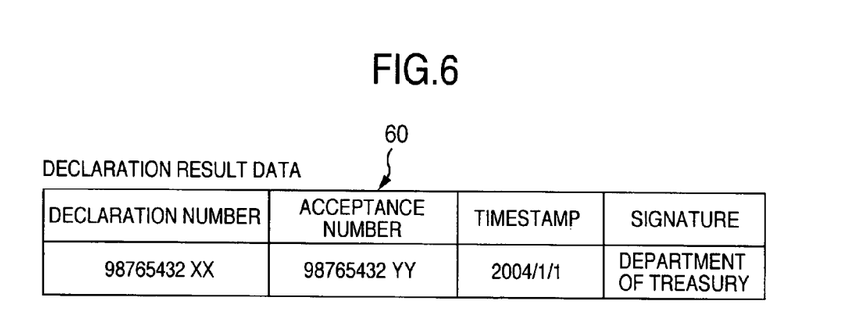
FIG. 6 is a diagram showing an example of declaration result data.

FIG. 6 shows an example of the declaration result data 60 that the tax declaration system 100 receives from the Treasury Department terminal 300. The declaration result data includes a declaration number assigned to the declaration data and an acceptance number assigned to the declaration number by the Department of the Treasury. This acceptance number may be assigned to only declaration data accepted by the Department of the Treasury or to all declaration data received by the Department of the Treasury. In the latter case, the declaration result data must include a result flag indicating whether the declaration data is accepted or rejected. In addition, the declaration result data includes a timestamp and the digital signature of the Treasury Department terminal or the Department of the Treasury.

Figure 13:
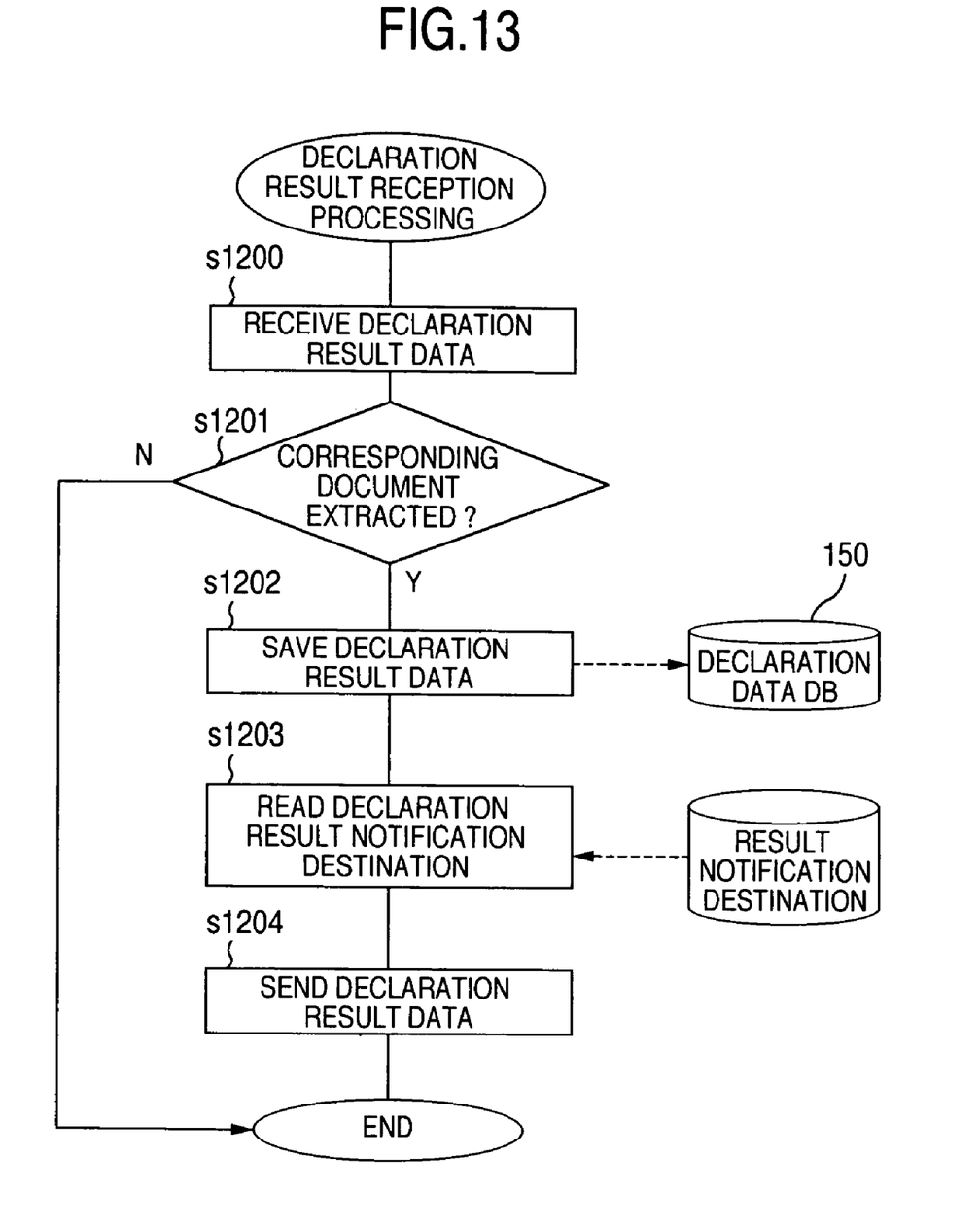
FIG. 13 is a flowchart showing the declaration result reception and notification processing of the tax declaration method according to present invention.

FIG. 13 is a flowchart showing the reception processing and the notification processing of the declaration result.

After sending the declaration data, the declaration execution unit 106 of the tax declaration system 100 receives the declaration result data from the Treasury Department terminal 300 (s1200). The declaration execution unit 106 searches the database 150 for the declaration number, included in the declaration result data, to determine if the declaration number is present in the database 150 (s1201) and, if it is not present (s1201: N), terminates the processing. On the other hand, if the declaration number is present (s1201: Y), the declaration result data or the name of the file in which the declaration result data is stored is recorded in the declaration result data field of the record in the database 150 (s1202).

In addition, the declaration result data may be sent to the user terminal 200 in response to the user's request. The declaration execution unit 106 searches the database 150 for the membership data 160 using the user ID and reads the result notification destination stored in the membership data 160 (s1203). The declaration execution unit 106 transfers the declaration result data to the notification destination (s1204) and terminates the processing.

3. Data Conversion

Financial information data received from the user terminal 200 and stored in the database 150 is converted to the declaration data format by the data conversion unit 104 of the tax declaration system 100.

Financial information used as declaration data is described in XBRL. In XBRL, financial information is described in two types of document: instance document and taxonomy document. Multiple copies of taxonomy document, which is a model of a document, are prepared according to the tax type and classification. An instance document, which is an XML document created by filling in the model with actual data, is part of declaration data that is submitted to the Department of the Treasury. In the description below, the part of the declaration data is called converted financial information data.

The account title names (label), the display order, and the processing order of converted financial information data are defined by a taxonomy document. The taxonomy document is composed of a taxonomy body (XML Schema) and a link base.

The taxonomy body (XML Schema) defines the vocabularies (element name, attribute, etc.) used in the instance document. For example, the actual account title names are defined. The taxonomy can be defined appropriately according to the field of the financial statement, for example, the taxonomy corresponding to the account base that differs among countries or the taxonomy by business category can be defined.

On the other hand, the link base (XLink) defines the document structure of the instance document and the display order and the processing order of the information. The link base is created as a file separate from the taxonomy body. In the link base, the link definition such as the display order of items, the data ownership of items, display content (label) of items, and bibliography can be defined.

In the tax declaration system 100, the rule for converting financial information data is defined in the schema setting unit 103, and the data conversion unit 104 converts the financial information data according to the rule stored in the schema setting unit 103. The schema setting unit 103 stores the XBRL Taxonomy (taxonomy document described above)

that describes the rule for converting the financial information data according to the specifications for various types of declaration data.

Figure 9:
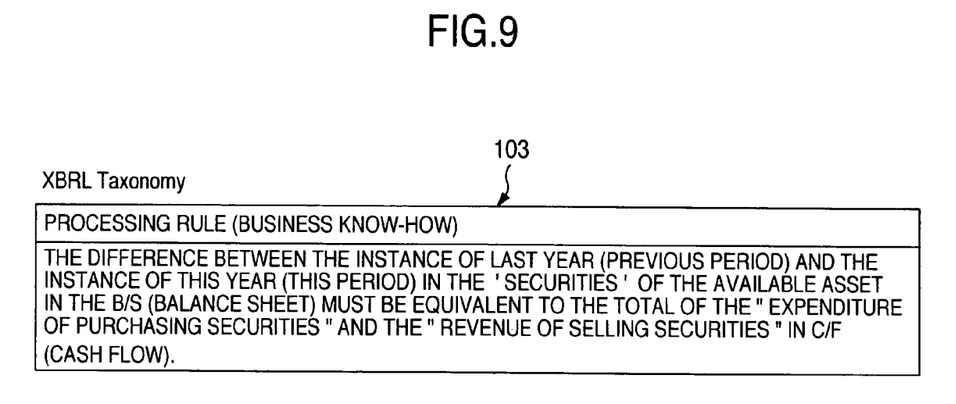
FIG. 9 is a diagram showing an example of rules described in XBRL taxonomy.

FIG. 9 shows an example of the rule. The statement "The difference between the instance of last year (previous period) and the instance of this year (this period) in the 'securities' of the available asset in the B/S must be equivalent to the total of the "expenditure of purchasing securities" and the "revenue of selling securities" in C/F (Cash Flow)" is shown in the figure. However, the statement is actually described as expressions prepared for converting the items and data of two different data tables.

The manager or accountant of the tax declaration system 100 defines those rules using the rule input unit 110.

4. Loan Application

The declaration data saved in the tax declaration system 100 can be reused as information for use when applying to a bank for a loan.

Figure 14:
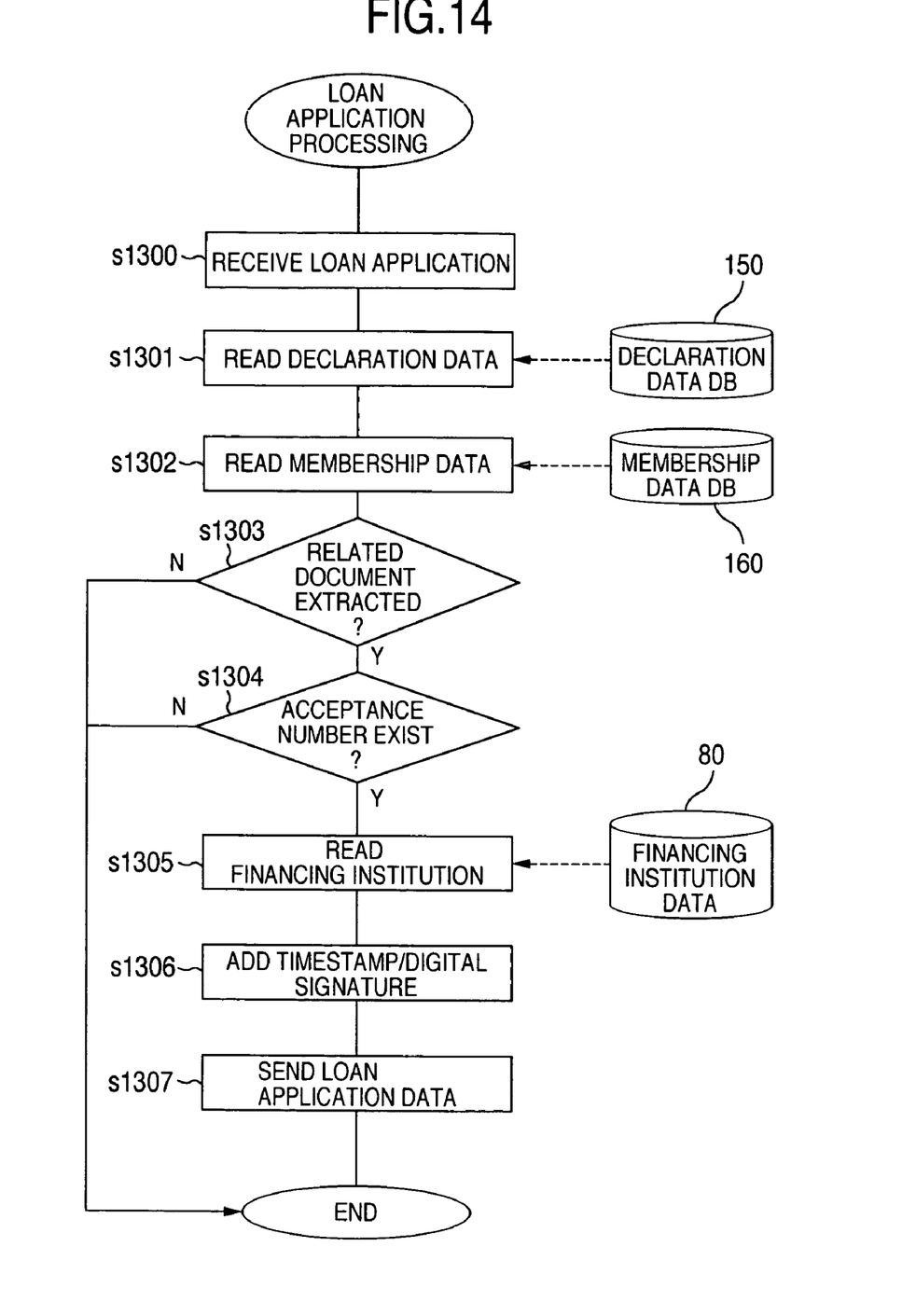
FIG. 14 is a flowchart showing the surrogate loan application processing of the tax declaration method according to present invention.

FIG. 14 is a flowchart showing the loan application processing.

The declaration data extraction unit 107 of the tax declaration system 100 receives a declaration data submission instruction, which is submitted to a bank, from the user terminal 200 (s1300). This submission instruction is received via a screen 1530 (FIG. 15) as a loan application instruction. In response to this instruction, the declaration data extraction unit 107 reads a record, identified by the user ID of the member (user), from the database 150 (s1301). In addition, the declaration data extraction unit 107 reads membership data on the member from the membership data database 160 to obtain information on the member who is a loan applicant (s1302).

If the record cannot be read (s1303: N), the declaration data extraction unit 107 terminates the processing. On the other hand, if the record can be read (s1303: Y), the declaration data extraction unit 107 checks the declaration result data field of the record to determine if the declaration data is accepted by the Department of the Treasury (s1304). If the declaration data is not yet accepted by the Department of the Treasury (s1304: N), the declaration data extraction unit 107 notifies the user that the data is not yet declared and terminates the processing. If the declaration data is accepted by the Department of the Treasury (s1304: Y), the declaration data extraction unit 107 determines that the declared data is already declared and available for use and passes control to the loan application unit 108.

Figure 8:
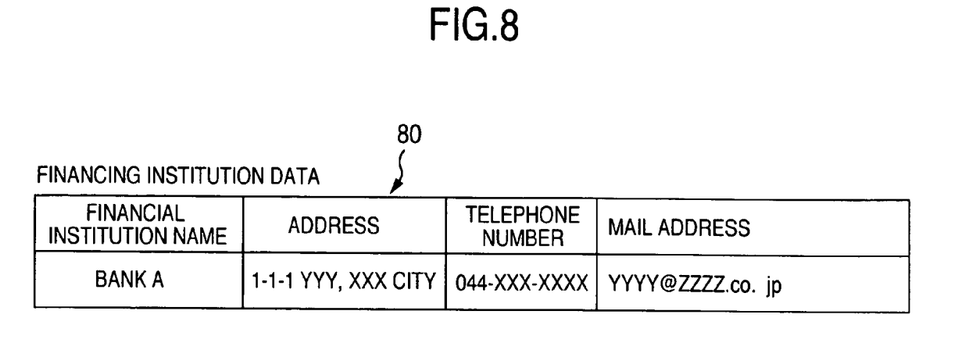
FIG. 8 is a diagram showing an example of the structure of financing institution data.

The loan application unit 108 obtains financing institution data 80 (see FIG. 8), corresponding to a financial institution specified by the user terminal 200, from the database stored in appropriate storage (s1305). The loan application unit 108 adds a timestamp to the loan application number, the declaration data and the declaration result data of the record extracted from the database 150 and adds the digital signature of the tax declaration system 100 or the accountant to create loan application data (s1306). The loan application unit 108 sends the loan application data to the bank terminal 400 (terminal of the financial institution) (s1307) and terminates the processing.

Figure 11B:
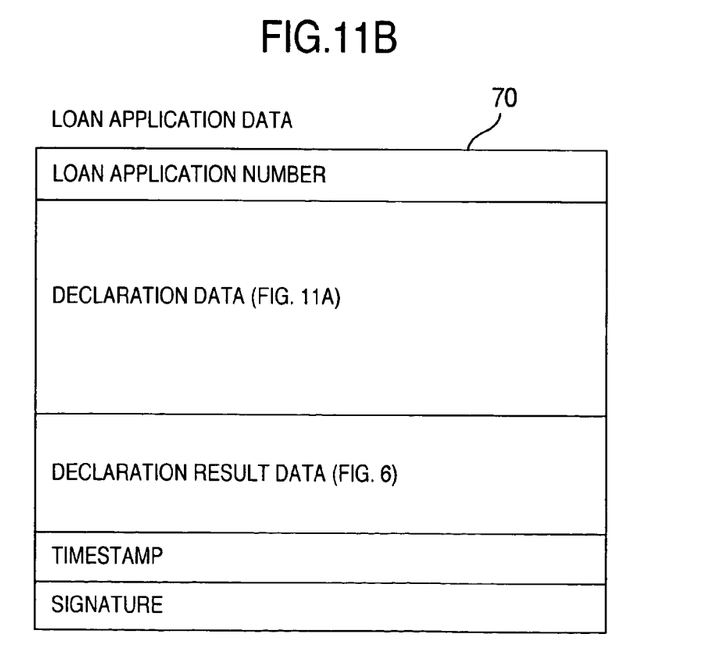

FIG. 11B shows an example of the structure of loan application data. The loan application number is used to associate the loan application data with desired loan contents (applicant, loan type, amount, repayment method, etc.).

The bank terminal 400 receives this loan application data, verifies the digital signature, determines whether or not the declaration data is altered, and uses the loan application data for screening the loan.

It is also possible that the loan application unit 108 sends the loan application data, not to the bank, but to the user terminal 200. In this case, the loan application unit 203 of the user terminal 200 sends the loan application data to the bank terminal 400.

5. Modifications

Other embodiments and modifications of the present invention will be described below.

Figure 2:
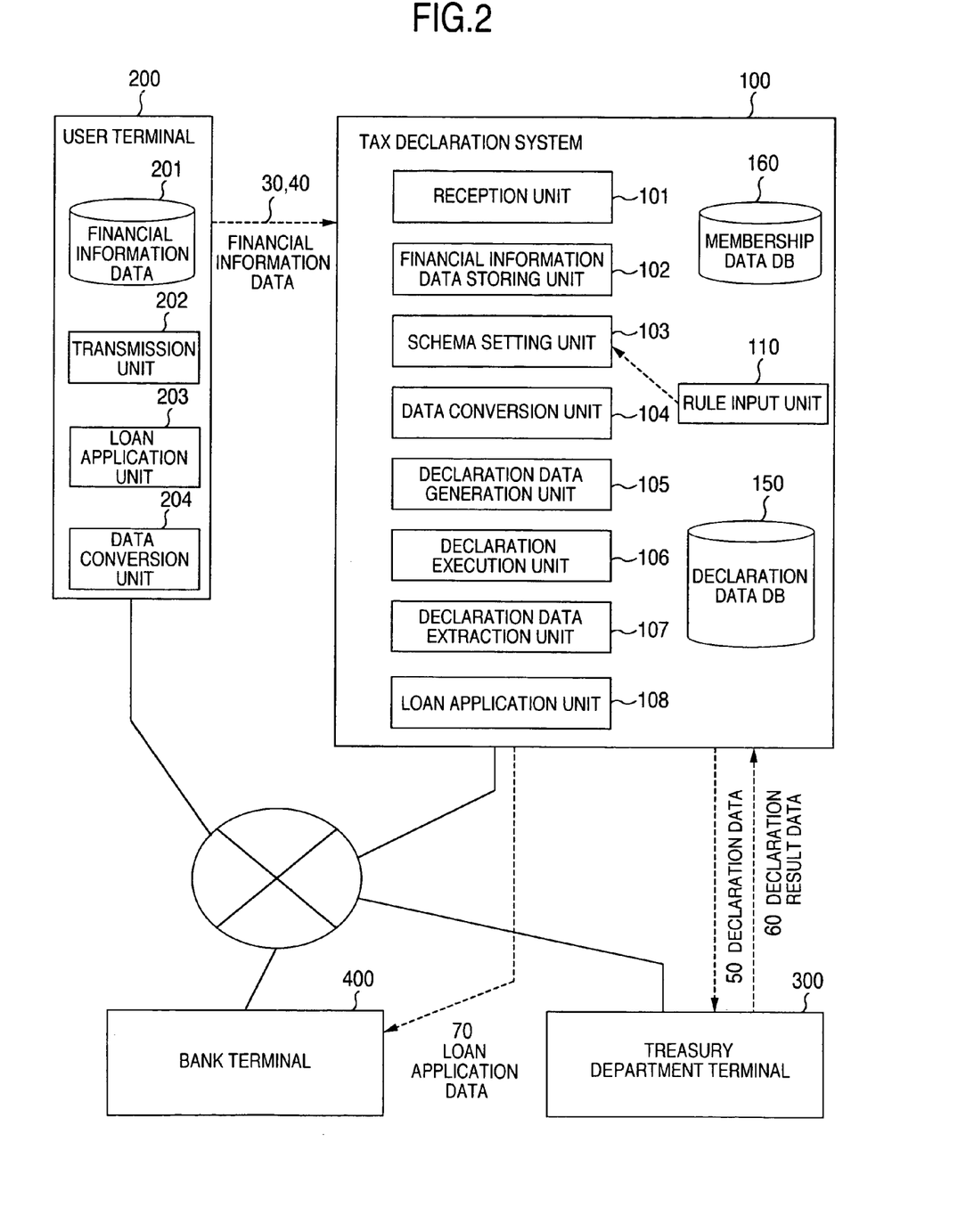
FIG. 2 is a diagram showing another example of the configuration of a network including a tax declaration system according to the present invention.

In the example of the configuration shown in FIG. 2, the user terminal 200 includes the data conversion unit 204 that converts financial information data, which is sent to the tax declaration system 100, to the XML format. This data conversion unit 204 generates ML-coded B/S data 205 and P/S data 206. The generated B/S data 205 and P/S data 206 are sent to the tax declaration system 100 by the transmission unit 202. On the other hand, the tax declaration system 100 receives this data via the reception unit 101, and the received B/S data 205 and P/S data 206 are further converted to the XBRL format by the data conversion unit 104.

It is also possible to implement the tax declaration system 100 and the user terminal 200 in one computer to build a system that allows the user to declare a tax without an accountant. The accountant may also enter the financial information data on the declarer. An example in which the tax declaration system 100 and the Treasury Department terminal 300 are combined and an example in which the tax declaration system 100 and bank terminal 400 are combined are also possible.

As the network, not only a LAN and the Internet but also a private line, a WAN (Wide Area Network), a power line network, a wireless network, a public line network, and a cellular phone network can be used. The virtual private network technology such as VPN (Virtual Private Network), if used, ensures a high-security communication when the Internet is used. It is desirable that all data sent via the network be encrypted.

The financial information data may also be coded in a format other than XML and XBRL.

It should be further understood by those skilled in the art that the foregoing description has been made on embodiments of the invention and that various changes and modifications may be made in the invention without departing from the spirit of the invention and the scope of the appended claims.

The invention claimed is:

1. A tax declaration system for electronically declaring a tax using a computer, comprising:
   a processor and a computer-readable storage unit;
   an input unit executable by the processor to receive financial information data to be declared which is described in XML (eXtensible Markup Language) and store the financial information data into a database in the storage unit;
   a schema setting unit executable by the processor to define specifications of declaration data and rules for converting the financial information data into declaration data, the specifications of declaration data and the rules being one or more taxonomy documents;
   a data conversion unit executable by the processor to convert the received financial information data into an XBRL (eXtensible Business Reporting Language) format according to the one or more taxonomy documents defined in said schema setting unit;
   a declaration data generation unit executable by the processor to read the financial information data which has not been processed from the database, require said data conversion unit to convert the read financial information data, add a digital signature to the converted financial information data for generating declaration data and store the declaration data into the database in the storage unit in association with the financial information data;

a declaration transmission unit executable by the processor to send the declaration data to a regulator handling a tax and store information that the financial information data associated with the sent declaration data has been processed into the database in the storage unit;

a declaration result reception unit executable by the processor to receive a declaration result of the declaration data from the regulator, check whether the declaration data is stored in the database, store the declaration result into the database in the storage unit associated with the declaration data if the declaration data is stored in the database, and terminate process if the declaration data is not stored in the database; and a loan application unit executable by the processor to create loan application data by checking whether the declaration data is associated with the declaration result in the database, terminating process if the declaration data is not associated with the declaration result, extracting the declaration data and the associated declaration result from the database in said storage unit if the declaration data is associated with the declaration result, and adding a digital signature to the extracted declaration data and the declaration result and send the created loan application data to an external unit.

2. The tax declaration system according to claim 1, wherein said input unit is executable by the processor to receive via a network the financial information data to be declared.

3. The tax declaration system according to claim 1, further comprising:

a rule input unit executable by the processor to input the rules in said schema setting unit.

4. The tax declaration system according to claim 1, wherein said input unit is executable by the processor to check the format of the received financial information data and, if the financial information data is not described in XML, convert the financial information data to an XML format.

5. The tax declaration system according to claim 1, wherein the declaration data further includes a declaration number, information on a declarer, and a timestamp.

6. The tax declaration system according to claim 5, wherein the declaration result includes a declaration number of declaration data, an acceptance number added by the regulator, a timestamp, and a digital signature added by the regulator.

7. The tax declaration system according to claim 1, wherein the loan application data further includes a loan application number and a timestamp.

8. The tax declaration system according to claim 1, wherein said loan application unit is executable by the processor to start processing in response to a request from a tax declarer.

9. A computer-implemented tax declaration method for electronically declaring a tax using a computer having a processor and a computer-readable storage unit, the method comprising the steps of:

receiving financial information data to be declared which is described in XML (eXtensible Markup Language) and storing the financial information data into a database in a computer-readable storage unit by an input unit;

defining specifications of declaration data and rules for converting the financial information data into declaration data using a scheme setting unit, the specifications of declaration data and rules being one or more taxonomy documents;

reading the financial information data which has not been processed from the database;

converting the read financial information data an XBRL (eXtensible Business Reporting Language) format according to the one or more taxonomy documents;

adding, by executing a declaration data generation unit of the computer with the processor, a digital signature to the financial information data for generating declaration data and storing the declaration data into the database in the storage unit in association with the financial information data;

sending, by executing a declaration transmission unit of the computer with the processor, the declaration data to a regulator handling a tax and storing information that the financial information data associated with the sent declaration data has been processed into the database in the storage unit;

receiving, by executing a declaration result reception unit of the computer with the processor, a declaration result of the declaration data from the regulator, checking whether the declaration data is stored in the database, storing the declaration result into the database in the storage unit associated with the declaration data if the declaration data is stored in the database, and terminating process if the declaration data is not stored in the database; and creating, by executing a loan application unit of the computer with the processor, loan application data by checking whether the declaration data is associated with the declaration result in the database, terminating process if the declaration data is not associated with the declaration result, extracting the declaration data and the associated declaration result from the database in said storage unit if the declaration data is associated with the declaration result, and adding a digital signature to the extracted declaration data and the declaration result and sending the created loan application data to an external unit.

10. A computer-readable storage medium storing a tax declaration program for electronically declaring a tax, the program comprising code for causing a computer to execute the steps of:

receiving financial information data to be declared which is described in XML (eXtensible Markup Language) and storing the financial information data into a database in a storage unit by an input unit;

defining specifications of declaration data and rules for converting the financial information data into declaration data using a scheme setting unit, the specifications of declaration data and rules being one or more taxonomy documents;

reading the financial information data which has not been processed from the database;

converting the read financial information data into an XBRL (eXtensible Business Reporting Language) format according to the one or more taxonomy documents;

adding a digital signature to the converted financial information data for generating declaration data and storing the declaration data into the database in the storage unit in association with the financial information data;

sending the declaration data to a regulator handling a tax and storing information that the financial information data associated with the sent declaration data has been processed into the database in the storage unit;

receiving a declaration result of the declaration data from the regulator, checking whether the declaration data is stored in the database, storing the declaration result into the database in the storage unit associated with the declaration data if the declaration data is stored in the database, and terminating process if the declaration data is not stored in the database; and creating loan application data by checking whether the declaration data is associated with the declaration result in the database, terminating process if the declaration data is not associated with the declaration result, extracting the declaration data and the associated declaration result from the database said storage unit if the declaration data is associated with the declaration result, and adding a digital signature to the extracted declaration data and the declaration result and sending the created loan application data to an external unit.

11. The method according to claim 9,
wherein the one or more taxonomy documents each include a taxonomy body which defines vocabularies to be used, and a link base which defines a document structure, a display order, and a processing order to be used.

12. The method according to claim 9, further comprising:
checking the format of the received financial information data and, if the financial information data is not described in XML, converting the financial information data to an XML format.

13. The method according to claim 9,
wherein the declaration data further includes a declaration number, information on a declarer, and a timestamp.

14. The method according to claim 13,
wherein the declaration result includes a declaration number of declaration data, an acceptance number added by the regulator, a timestamp, and a digital signature added by the regulator.

15. The method according to claim 9,
wherein the loan application data further includes a loan application number and a timestamp.

16. The computer-readable storage medium according to claim 10,
wherein the one or more taxonomy documents each include a taxonomy body which defines vocabularies to be used, and a link base which defines a document structure, a display order, and a processing order to be used.

17. The computer-readable storage medium according to claim 10, wherein the program further comprises code for causing the computer to execute the step of:
checking the format of the received financial information data and, if the financial information data is not described in XML, converting the financial information data to an XML format.

18. The computer-readable storage medium according to claim 10,
wherein the declaration data further includes a declaration number, information on a declarer, and a timestamp.

19. The computer-readable storage medium according to claim 18,
wherein the declaration result includes a declaration number of declaration data, an acceptance number added by the regulator, a timestamp, and a digital signature added by the regulator.

20. The tax declaration system according to claim 1,
wherein the one or more taxonomy documents each include a taxonomy body which defines vocabularies to be used, and a link base which defines a document structure, a display order, and a processing order to be used.

* * * * *